United States Patent
Andrews

(10) Patent No.: US 11,815,132 B2
(45) Date of Patent: Nov. 14, 2023

(54) BUSHING INSERTION SYSTEMS AND METHODS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 17/199,133

(22) Filed: Mar. 11, 2021

(65) Prior Publication Data
US 2021/0285499 A1    Sep. 16, 2021

Related U.S. Application Data

(60) Provisional application No. 62/989,537, filed on Mar. 13, 2020.

(51) Int. Cl.
*F16C 43/02* (2006.01)
*B23P 15/00* (2006.01)
(Continued)

(52) U.S. Cl.
CPC ............ *F16C 43/02* (2013.01); *B23P 15/003* (2013.01); *B23P 15/00* (2013.01); *B25B 11/00* (2013.01); *B25B 27/00* (2013.01); *B25B 27/14* (2013.01)

(58) Field of Classification Search
CPC ......... B25B 11/00; B25B 27/00; B25B 27/14; B25B 27/023; B25B 27/06; B25B 27/062;
(Continued)

(56) References Cited

U.S. PATENT DOCUMENTS

| 569,527 A | 10/1896 | Tilton |
| 689,154 A | 12/1901 | Bartlett |

(Continued)

FOREIGN PATENT DOCUMENTS

| AU | 2015200630 B2 | 5/2018 |
| AU | 2015200375 B2 | 7/2019 |

(Continued)

OTHER PUBLICATIONS

Canadian Intellectual Property Office, "Office Action, Application No. 2,880,139", dated Jan. 7, 2019, 3 pages.
(Continued)

*Primary Examiner* — Lee D Wilson
*Assistant Examiner* — Robert F Neibaur
(74) *Attorney, Agent, or Firm* — Schacht Law Office, Inc.; Michael R. Schacht

(57) ABSTRACT

An insertion system for inserting a bushing assembly into a housing opening in a structural member comprising a brace assembly, an actuator assembly, and a drive plate. The brace assembly comprises a brace rod, an anchor member defining an anchor member recess, and a brace nut. The actuator assembly comprises an actuator housing defining an actuator housing opening and a drive member defining a drive member opening. The drive plate defines a drive plate recess. The anchor member acts on the structural member and the brace nut acts on the actuator assembly. Operation of the actuator assembly displaces the drive plate. Displacement of the drive plate displaces the bushing assembly into the housing opening.

13 Claims, 9 Drawing Sheets

(51) Int. Cl.
  *B25B 11/00* (2006.01)
  *B25B 27/00* (2006.01)
  *B25B 27/14* (2006.01)

(58) Field of Classification Search
  CPC ... B25B 27/0028; B25B 27/064; B25B 27/28;
       B23P 15/00; B23P 15/003; F16C 43/02;
       Y10T 29/53861; Y10T 29/53848; Y10T
       29/538; Y10T 29/5383; Y10T 29/53657;
       Y10T 29/53796; Y10T 29/53843; Y10T
                           29/53839; Y10T 29/53952
  USPC ...... 29/244, 256, 258, 259, 263, 426.5, 255,
                                      29/278; 269/278
  See application file for complete search history.

(56) References Cited

U.S. PATENT DOCUMENTS

| | | |
|---|---|---|
| 1,131,868 A | 3/1915 | Ridlon |
| 1,155,720 A | 10/1915 | Louis |
| 1,334,658 A | 3/1920 | Koch |
| 1,368,760 A | 2/1921 | Schilling |
| 1,429,567 A | 9/1922 | Carlisle |
| 1,476,983 A | 12/1923 | King |
| 1,498,638 A | 6/1924 | Periolat |
| 1,552,616 A | 9/1925 | Jake |
| 1,650,964 A | 11/1927 | Schmitt |
| 1,682,956 A | 9/1928 | Dawson et al. |
| 1,778,802 A | 10/1930 | Howell |
| 1,817,988 A | 8/1931 | Klamt |
| 1,849,805 A | 3/1932 | Raymond |
| 1,857,211 A | 5/1932 | Odlum et al. |
| 1,990,570 A | 2/1935 | Smith |
| 1,996,967 A | 4/1935 | Kratky |
| 2,036,782 A | 4/1936 | Ullmo |
| 2,052,534 A | 8/1936 | Quarles |
| 2,290,427 A | 7/1942 | Harrington |
| 2,374,861 A | 5/1945 | Graham |
| 2,380,980 A | 8/1945 | Looney |
| 2,427,948 A | 9/1947 | Cornwell |
| 2,484,129 A | 10/1949 | Taylor |
| 2,549,429 A | 4/1951 | Cowles |
| 2,681,501 A | 6/1954 | Albert |
| 2,755,540 A | 7/1956 | Crozier |
| 2,798,392 A | 7/1957 | Randolph |
| 3,102,333 A | 9/1963 | Thornton et al. |
| 3,200,483 A | 8/1965 | Menegoni |
| 3,237,291 A | 3/1966 | Kelso |
| 3,336,652 A | 8/1967 | Andre |
| 3,662,449 A | 5/1972 | Seiichi |
| 3,742,570 A | 7/1973 | Felser |
| 3,862,483 A | 1/1975 | Kloster |
| 3,964,149 A | 6/1976 | Hugh |
| 4,034,458 A | 7/1977 | Ford et al. |
| 4,195,398 A | 4/1980 | Matthews |
| 4,363,475 A | 12/1982 | McCarty |
| 4,398,706 A | 8/1983 | Kaulfuss |
| 4,426,758 A * | 1/1984 | Castoe .................. B25B 27/023  29/265 |
| 4,428,105 A | 1/1984 | Abbott et al. |
| 4,589,180 A | 5/1986 | Vachon |
| 4,624,039 A | 11/1986 | Lawrence et al. |
| 4,648,166 A | 3/1987 | Tilman |
| 4,649,615 A | 3/1987 | Hundley |
| 4,672,731 A | 6/1987 | Taylor |
| 4,691,424 A | 9/1987 | Michael et al. |
| 4,765,057 A | 8/1988 | Muller |
| 4,769,890 A | 9/1988 | Maynard |
| 4,770,401 A | 9/1988 | Donaldson |
| 4,771,528 A | 9/1988 | Stromberg |
| 4,867,366 A | 9/1989 | Kleinholz |
| 4,940,370 A | 7/1990 | Gipson |
| 4,941,252 A | 7/1990 | Haisch et al. |
| 4,976,280 A | 12/1990 | Lagana |
| 4,977,660 A | 12/1990 | Maynard |
| 5,125,324 A | 6/1992 | Araki et al. |
| 5,159,743 A | 11/1992 | Somerville |
| 5,163,665 A | 11/1992 | Klearman |
| 5,174,005 A | 12/1992 | Somerville |
| 5,181,303 A | 1/1993 | Gregg |
| 5,210,919 A | 5/1993 | Garman |
| 5,211,211 A | 5/1993 | Rubino et al. |
| 5,224,254 A | 7/1993 | McPeak et al. |
| 5,233,741 A | 8/1993 | Maynard |
| 5,255,435 A | 10/1993 | Shultz |
| 5,257,445 A | 11/1993 | Mayberry |
| 5,271,136 A | 12/1993 | Skoworodko |
| 5,341,553 A | 8/1994 | Herzhauser |
| 5,419,027 A | 5/1995 | McPeak et al. |
| 5,519,929 A | 5/1996 | Bleckman |
| 5,535,973 A | 7/1996 | Bailey et al. |
| 5,557,833 A | 9/1996 | Pool |
| 5,586,378 A | 12/1996 | Smith |
| 5,606,788 A | 3/1997 | Rubino et al. |
| 5,692,437 A | 12/1997 | Tabain |
| 5,787,561 A | 8/1998 | Harmand |
| 5,839,180 A | 11/1998 | Hochmiller |
| RE36,009 E | 12/1998 | Shultz |
| 5,857,252 A | 1/1999 | Jansen |
| 5,887,328 A | 3/1999 | Rydin et al. |
| 5,893,202 A * | 4/1999 | Graham .............. B25B 27/0028  29/402.02 |
| 5,898,985 A | 5/1999 | Villarreal |
| 5,983,474 A | 11/1999 | Koppe |
| 6,192,566 B1 | 2/2001 | Dunum |
| 6,505,390 B2 | 1/2003 | Emanuel |
| 6,618,920 B1 | 9/2003 | Emanuel |
| 6,716,218 B2 | 4/2004 | Holmes et al. |
| 6,789,791 B2 | 9/2004 | Genduso |
| 7,003,877 B2 | 2/2006 | Reale |
| 7,020,944 B2 | 4/2006 | Klann |
| 7,093,809 B2 | 8/2006 | Hwang |
| 7,117,573 B1 | 10/2006 | Hu |
| 7,213,317 B2 | 5/2007 | Hu |
| 7,219,885 B2 | 5/2007 | Nardozza |
| 7,387,296 B2 | 6/2008 | Alberti |
| 7,475,465 B1 | 1/2009 | Weiss |
| 7,520,041 B1 | 4/2009 | Aguilar |
| 7,669,305 B1 | 3/2010 | Lionberg |
| 7,669,306 B2 | 3/2010 | Palka |
| 7,685,688 B2 | 3/2010 | Fan |
| 7,707,709 B2 * | 5/2010 | Whitehead .............. B25B 27/06  29/724 |
| 7,717,573 B2 | 5/2010 | Matsubara et al. |
| 7,818,860 B2 | 10/2010 | Hume et al. |
| 7,890,305 B2 | 2/2011 | Lionberg |
| 7,891,084 B1 | 2/2011 | Sollami |
| 7,895,723 B2 | 3/2011 | Wridt et al. |
| 7,918,003 B2 * | 4/2011 | Acciardo, Jr. ........ B25B 27/062  29/263 |
| 7,996,972 B2 | 8/2011 | Hu |
| 8,387,252 B1 | 3/2013 | Johnson et al. |
| 8,567,292 B1 | 10/2013 | Park et al. |
| 8,627,557 B2 | 1/2014 | Jansen et al. |
| 8,689,420 B2 | 4/2014 | Barrios et al. |
| 8,745,832 B2 * | 6/2014 | Barrios ................ B25B 27/023  29/259 |
| 9,107,719 B2 | 8/2015 | Gauthier |
| 9,511,488 B2 | 12/2016 | Andrews et al. |
| 9,718,177 B1 | 8/2017 | Bell |
| 9,751,199 B2 | 9/2017 | Andrews |
| 9,808,922 B2 | 11/2017 | Breschi et al. |
| 9,908,208 B2 | 3/2018 | Andrews |
| 10,005,175 B2 | 6/2018 | Morris |
| 10,265,839 B1 | 4/2019 | Hunter |
| 10,307,901 B2 | 6/2019 | Andrews |
| 10,583,546 B2 * | 3/2020 | Yang .................... B25B 27/062 |
| 10,744,627 B2 | 8/2020 | Andrews |
| 10,906,140 B2 | 2/2021 | Andrews |
| 10,987,788 B2 | 4/2021 | Andrews |
| 11,090,788 B2 * | 8/2021 | Huang ................ B25B 27/062 |
| 11,285,583 B2 * | 3/2022 | Stuart ................ B25B 23/0035 |
| 2001/0029655 A1 | 10/2001 | Emanuel |
| 2002/0095759 A1 | 7/2002 | Scott |

(56) References Cited

U.S. PATENT DOCUMENTS

| | | |
|---|---|---|
| 2003/0033909 A1 | 2/2003 | Gore |
| 2003/0084555 A1 | 5/2003 | Meggiolan |
| 2003/0106197 A1 | 6/2003 | Emanuel |
| 2005/0071973 A1 | 4/2005 | Emanuel |
| 2006/0037184 A1 | 2/2006 | Miller |
| 2006/0070221 A1 | 4/2006 | Wridt et al. |
| 2006/0162509 A1 | 7/2006 | Wang |
| 2007/0251076 A1 | 11/2007 | Zhong et al. |
| 2008/0289841 A1 | 11/2008 | Kang |
| 2009/0025514 A1 | 1/2009 | Barrios et al. |
| 2009/0211094 A1 | 8/2009 | Adelman |
| 2010/0000749 A1 | 1/2010 | Andel |
| 2010/0236039 A1 | 9/2010 | Robledo |
| 2010/0251528 A1 | 10/2010 | Hu |
| 2010/0281665 A1 | 11/2010 | Punaro |
| 2010/0283193 A1 | 11/2010 | Huang |
| 2011/0048649 A1 | 3/2011 | Komatsu et al. |
| 2011/0094076 A1 | 4/2011 | Liu |
| 2011/0219617 A1 | 9/2011 | Barrios et al. |
| 2012/0110815 A1 | 5/2012 | Brown |
| 2012/0272499 A1 | 11/2012 | Schley et al. |
| 2013/0026692 A1 | 1/2013 | Prins |
| 2014/0338166 A1* | 11/2014 | Studney ............. B25B 27/023 29/256 |
| 2014/0345104 A1 | 11/2014 | Andrews et al. |
| 2014/0366954 A1 | 12/2014 | Miller et al. |
| 2015/0183102 A1 | 7/2015 | Breschi et al. |
| 2015/0183268 A1 | 7/2015 | Baldassara et al. |
| 2015/0209918 A1 | 7/2015 | Andrews |
| 2015/0224635 A1 | 8/2015 | Andrews |
| 2017/0209994 A1 | 7/2017 | Hargrove et al. |
| 2017/0297152 A1 | 10/2017 | Andrews |
| 2017/0307020 A1 | 10/2017 | Andrews |
| 2017/0361438 A1 | 12/2017 | Andrews |
| 2018/0207776 A1 | 7/2018 | Andrews |
| 2018/0370002 A1* | 12/2018 | Andrews ............. B25B 1/2457 |
| 2019/0070716 A1 | 3/2019 | Andrews |

FOREIGN PATENT DOCUMENTS

| | | |
|---|---|---|
| AU | 2017248765 B2 | 11/2021 |
| CA | 2852069 A1 | 11/2014 |
| CA | 2880139 A1 | 7/2015 |
| CA | 2881390 A1 | 8/2015 |
| CA | 2890557 A1 | 10/2015 |
| CA | 2965264 A1 | 4/2016 |
| CA | 2965324 A1 | 4/2016 |
| CA | 3015834 A1 | 9/2017 |
| CA | 3015852 A1 | 10/2017 |
| CA | 2852069 C | 1/2019 |
| CA | 3037021 A1 | 9/2019 |
| CA | 3015834 C | 5/2021 |
| CN | 106414122 A | 2/2017 |
| DE | 19631524 C1 | 11/1997 |
| DE | 20113561 U1 | 11/2001 |
| DE | 10221280 C1 | 8/2003 |
| EP | 0988937 A2 | 3/2000 |
| EP | 2461061 A2 | 6/2012 |
| EP | 3442751 A1 | 2/2019 |
| EP | 3423238 A4 | 11/2019 |
| EP | 3442751 A4 | 1/2020 |
| EP | 3678820 A4 | 6/2021 |
| FR | 2387090 A1 | 11/1978 |
| FR | 2670703 A1 | 6/1992 |
| JP | 104800 | 9/1974 |
| JP | 192877 | 12/1987 |
| JP | 4105881 A | 4/1992 |
| JP | 3160459 U | 6/2010 |
| KR | 100746562 B | 8/2007 |
| KR | 101746033 B | 6/2017 |
| RU | 2028933 C1 | 2/1995 |
| SU | 654401 A2 | 3/1979 |
| SU | 1207744 A | 1/1986 |
| SU | 1384368 A1 | 3/1988 |
| SU | 1505740 A1 | 9/1989 |
| SU | 1632766 A1 | 3/1991 |
| TW | 306377 U | 5/1997 |
| TW | 471371 U | 1/2002 |
| TW | M342918 U | 10/2008 |
| TW | M497081 U | 3/2015 |
| WO | 2011012552 A1 | 2/2011 |
| WO | 2016065311 A1 | 4/2016 |
| WO | 2016063140 A3 | 6/2016 |
| WO | 2017151953 A1 | 9/2017 |
| WO | 2017181078 A1 | 10/2017 |
| WO | 2019050989 A1 | 3/2019 |
| WO | 2021183800 A1 | 9/2021 |

OTHER PUBLICATIONS

Greenerd, "Arbor Press History," Website http://www.greenerd.com/about-greenerd/history/default.aspxp. 2, predates Mar. 13, 2020, 5 pages.

International Searching Authority, ISR & Written Opinion, PCT/IB2015/002481, dated May 10, 2017, 6 pages.

International Searching Authority, ISR & Written Opinion, PCT/US2015/057201, dated Dec. 22, 2015, 9 pages.

International Searching Authority, ISR & Written Opinion, PCT/US2017/020496, dated Jun. 1, 2017, 7 pages.

International Searching Authority, ISR & Written Opinion, PCT/US2017/027724, dated Aug. 17, 2017, 7 pages.

International Searching Authority, ISR & Written Opinion, PCT/US2018/049608, dated Dec. 6, 2018, 8 pages.

International Searching Authority, ISR & Written Opinion, PCT/US2021/021963, dated Jun. 3, 2021, 7 pages.

OTC, "Wheel Stud Remover/Installer," Product Brochure, 2009, 1 page, Product No. 5195.

OTC, "Wheel Stud Service Kit," Product Brochure, 2012, 1 page, Product No. 4295.

Semenov V. M., "Non-standard tool for dismantling and assembly work", Moskva, Izdatelstvo Kolos, (19750000), pp. 200-201, 219, 220, 253, 254, 257.

Toyota, "4Runner Repair Manual, Inspection and Repair of Front Axle Hub" 1990, p. 1 and SA-18, vol. 2, Publication No. RM143U2.

USPTO, "Final Office Action, U.S. Appl. No. 14/616,693," dated May 3, 2017, 10 pages.

USPTO, "Non-Final Office Action, U.S. Appl. No. 15/520,196," dated Apr. 2, 2019, 8 pages.

Wikipedia, "Hydraulic Press," Website http://en.wikipedia.org/wiki/Hydraulic-pressp., predates Mar. 13, 2020, 1.

* cited by examiner

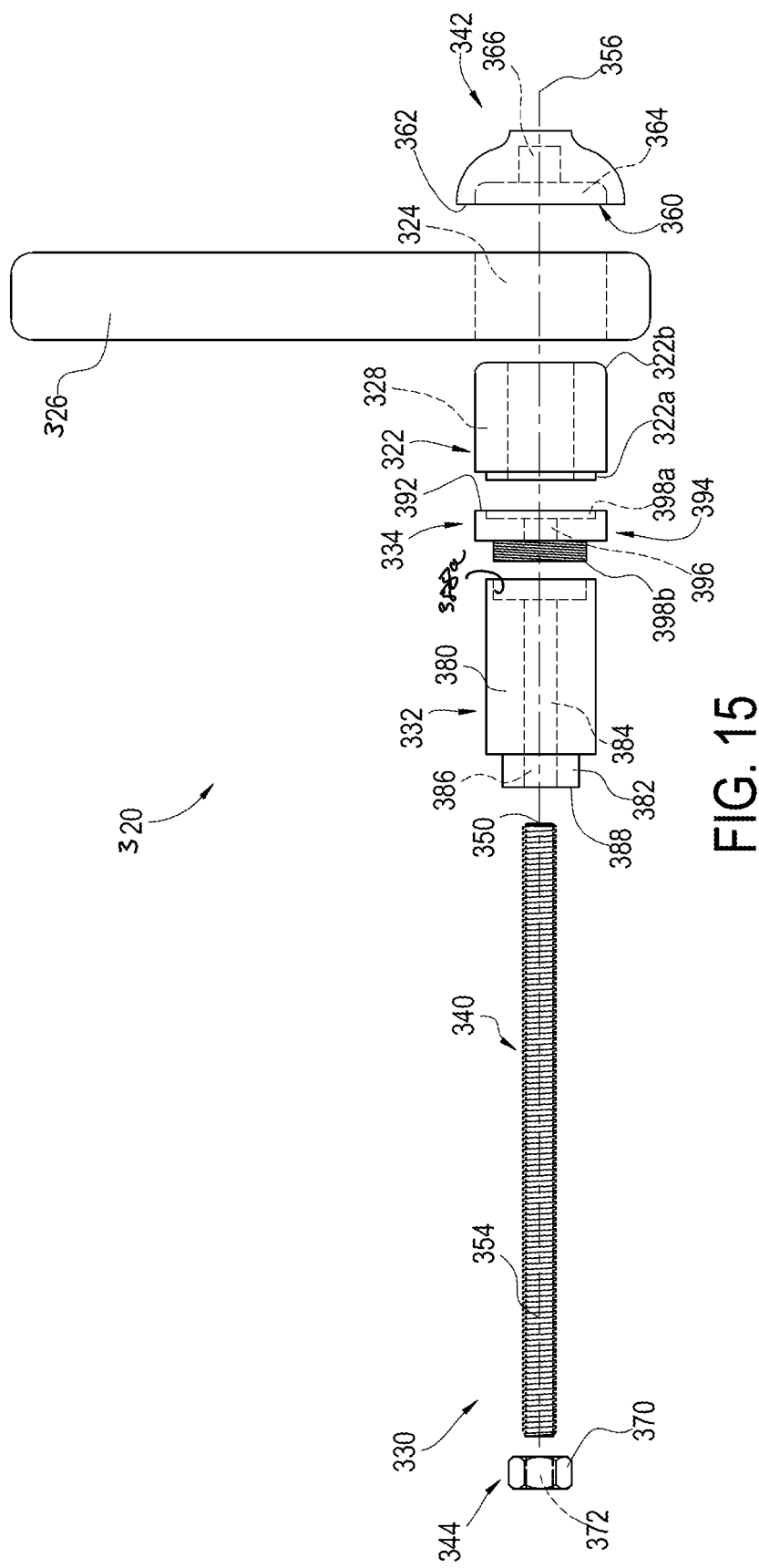

BUSHING INSERTION SYSTEMS AND METHODS

RELATED APPLICATIONS

This application, U.S. patent application Ser. No. 17/199,133 filed Mar. 11, 2021 claims benefit of U.S. Provisional Application Ser. No. 62/989,537 filed Mar. 13, 2020, the contents of which are incorporated herein by reference.

TECHNICAL FIELD

The present invention relates to tool systems and methods for inserting bushings into a housing opening defined by a structural member.

BACKGROUND

Bushings are a form of bearing that is used to support a rotating shaft relative to a structural member. Bushings can be removed and replaced when worn or damaged. Typically, a bushing defines an outer diameter sized and dimensioned to be snugly received within the housing opening and an inner diameter sized and dimensioned to snugly receive the rotating shaft.

The present invention relates to the insertion of solid sleeve bushings into a housing opening defined by the structural member.

To replace a worn bushing, the rotating shaft is first removed from the inner opening defined by the worn bushing. The worn bushing is then pressed out of the housing opening. The replacement bushing is then pressed into the housing opening such that the replacement bushing is rigidly supported by the structural member in a desired position relative to the structural member. The rotating shaft is next arranged within the inner opening of the replacement bushing.

The present invention is of particular significance when used as part of the step of pressing a bushing into a housing opening, and that application of the present invention will be described herein.

SUMMARY

Systems and methods for inserting a bushing assembly into a housing opening in a structural member are disclosed. An example insertion system comprises a brace assembly, an actuator assembly and a drive plate. The brace assembly comprises a brace rod, an anchor member defining an anchor member recess, and a brace nut. The actuator assembly comprising an actuator housing defining an actuator housing opening and a drive member defining a drive member opening. The drive plate defines a drive plate recess. The anchor member acts on the structural member and the brace nut acts on the actuator assembly. Operation of the actuator assembly displaces the drive plate. Displacement of the drive plate displaces the bushing assembly into the housing opening.

An example method of inserting a bushing assembly into a housing opening in a structural member comprises engaging an external surface of a brace rod with an anchor member to fix a position of the anchor member relative to the brace rod. The brace rod is extended through the housing opening of the structural member and a bushing assembly. The drive plate is arranged such that the brace rod extends through the drive plate recess. The actuator assembly is arranged by extending the brace rod through an actuator housing opening and a drive member opening. The brace nut is rotated along the brace rod until the brace nut engages the actuator housing. The actuator assembly is operated by displacing the drive plate, which displaces the bushing assembly into the housing opening.

An example insertion system for inserting a bushing assembly into a housing opening in a structural member comprises a brace assembly, an actuator assembly and a drive plate. The brace assembly comprises a brace rod, an anchor member defining an anchor member recess, and a brace nut. The actuator assembly comprising an actuator housing defining an actuator housing opening and a drive member defining a drive member opening. The drive plate defines a drive plate recess. The drive member engages the brace nut and the actuator housing supports the drive plate. The anchor member acts on the structural member and the brace nut acts on the actuator assembly. Operation of the actuator assembly displaces the drive plate. Displacement of the drive plate displaces the bushing assembly into the housing opening.

BRIEF DESCRIPTION OF THE DRAWINGS

FIG. 15 is an exploded side elevation view illustrating the components of a fourth example bushing assembly insertion system of the present invention that is adapted to insert a bushing assembly into bushing opening in a structural member.

DETAILED DESCRIPTION

Figure 1:
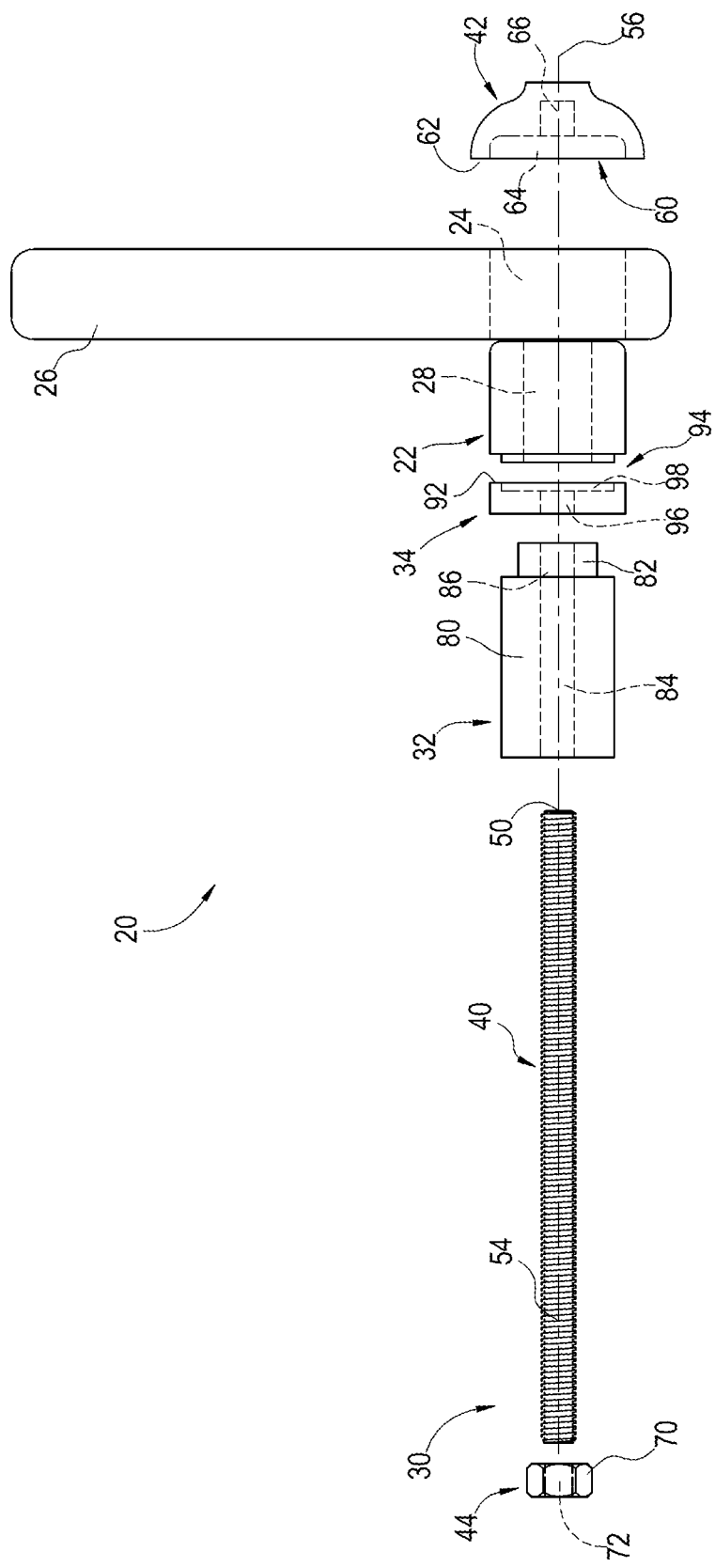
FIG. 1 is an exploded side elevation view illustrating the components of a first example bushing assembly insertion system of the present invention that is adapted to insert a bushing assembly into bushing opening in a structural member.

Referring initially to FIG. 1 of the drawing, depicted therein is a first example bushing assembly insertion system 20 constructed in accordance with, and embodying, the principles of the present invention. FIG. 1 further illustrates that the first example bushing assembly insertion system 20 may be used to insert an example bushing assembly 22 into an example housing opening 24 defined by an example structural member 26. FIG. 1 further illustrates that the example bushing assembly 22 defines a bushing assembly opening 28 sized and dimensioned to receive a shaft (not shown). The example bushing assembly 22 and structural member 26, including the housing opening 24, are or may be conventional and will not be described herein beyond that extent helpful for a complete understanding of the construction and operation of the first example bushing assembly insertion system 20.

Figure 2:
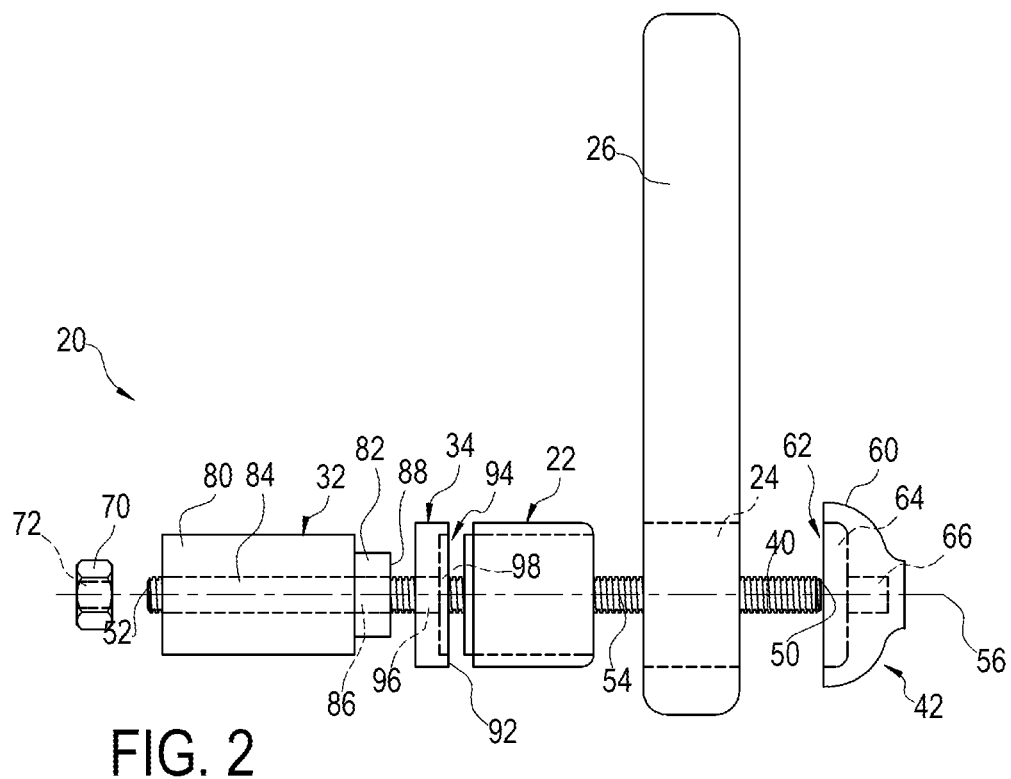
FIG. 2 is partial exploded side elevation view of the first example bushing assembly insertion system, the bushing assembly, and the structural member.

As shown in FIGS. 1 and 2, the first example bushing assembly insertion system 20 comprises a brace assembly 30, an actuator assembly 32, and a drive plate 34. The example brace assembly 30 comprises a brace rod 40, an anchor member 42, and a brace nut 44. At least a portion of the example brace rod 40 is arranged to extend through bushing assembly opening 28 in the bushing assembly 22 and the housing opening 24 in the structural member 26 to support the brace nut 44, the actuator assembly 32, the drive plate 34 on a first side of the housing opening 24 and the anchor member 42 on a second side of the housing opening 24. So arranged, operation of the actuator assembly 32 acts on the bushing assembly 22 through the drive plate 34 to force the bushing assembly 22 into the bushing assembly opening 24. The example brace assembly 30 engages the structural member 26 to prevent the actuator assembly 32 from displacing itself away from the structural member 26 during operation of the actuator assembly 32.

Given the foregoing general understanding of the construction and operation of the first example bushing assembly insertion system 20, the details of construction and operation of the first example bushing assembly insertion system 20 of the present invention will now be described.

The example brace rod 40 defines a first rod end 50 and a second rod end 52, and an outer surface 54 of the example brace rod 40 is threaded at least adjacent to the first rod end 52 and to the second rod end 54. The example brace rod 40 as depicted is threaded along its entire length, but only a portion of the brace rod 40 need be threaded as will become apparent from the following discussion. The example brace rod 40 defines a brace rod axis 56.

The example anchor member 42 defines an anchor cavity 60 and an anchor edge surface 62. The anchor cavity 60 defines an anchor cavity spacing portion 64 and an anchor cavity threaded portion 66. The anchor cavity threaded portion 66 is sized and dimensioned to receive the threaded outer surface 54 of the brace rod 40 adjacent to the first rod end 50. Accordingly, axial rotation of the brace rod 40 and anchor member 42 relative to each other about the brace rod axis 56 with the threaded outer surface 54 within the anchor cavity threaded portion 66 prevents displacement of the anchor member 42 relative to the brace rod 40 along the brace rod axis 56 under predetermined tension loads exerted by the actuator assembly 32.

The example brace nut 44 is or may be conventional and defines an external nut surface 70 and an internal threaded nut opening 72. The internal threaded nut opening 72 is sized and dimensioned to receive the threaded outer surface 54 of the brace rod 40 adjacent to the second rod end 52. Accordingly, axial rotation of the brace rod 40 and brace nut 44 relative to each other about the brace rod axis 56 with the threaded outer surface 54 within the internal threaded nut opening 72 prevents displacement of the brace nut 44 relative to the brace rod 40 along the brace rod axis 56 under predetermined tension loads exerted by the actuator assembly 32. The example external nut surface 50 is a hex surface but other surface configurations may be used.

The example actuator assembly 32 comprises an actuator housing 80 and an actuator drive member 82. The example actuator assembly 32 is or may be conventional and will be described herein only to that extent helpful for a complete understanding of the construction and operation of the first example bushing assembly insertion system 20. The example actuator housing 80 defines an actuator housing opening 84, and the example actuator drive member 82 defines an actuator drive member opening 86. The example drive member 82 defines a drive surface 88. Operation of the example actuator assembly 32 causes displacement of the example actuator drive member 82 relative to the actuator housing 80. The example actuator assembly 32 may be operated using an electrical drive system, pneumatic drive system, hydraulic drive system, or any other appropriate drive system. The drive system used to supply power to the example actuator system 32 is or may be conventional and is not depicted in the drawing for simplicity and clarity.

The example drive plate 34 defines a first drive plate surface 90, a second drive plate surface 92, and a drive plate opening 94. The example drive plate opening 94 defines a drive plate opening first portion 96 and a drive plate opening second portion 98. The drive plate opening 94 extends between the first drive plate surface 90 and the second drive plate surface 92.

As perhaps best shown in FIG. 2, the example brace rod 40 is sized and dimensioned such that the example brace rod 40 may be arranged to extend through the actuator housing opening 84, the actuator drive member opening 86, the drive plate opening 94, and the bushing opening 28. FIG. 2 further illustrates that the example brace rod 40 is sized and dimensioned to extend through the anchor cavity spacing portion 64 of the anchor cavity 60. And as described above, the anchor rod 40 is further sized and dimensioned such that to be threaded into the anchor cavity threaded portion 66 and at least partly into the internal nut threaded opening 72. As arranged in FIG. 2, the rod axis 56 of the brace rod 40 defines a longitudinal axis of the first example bushing assembly insertion system 20.

Figure 3:
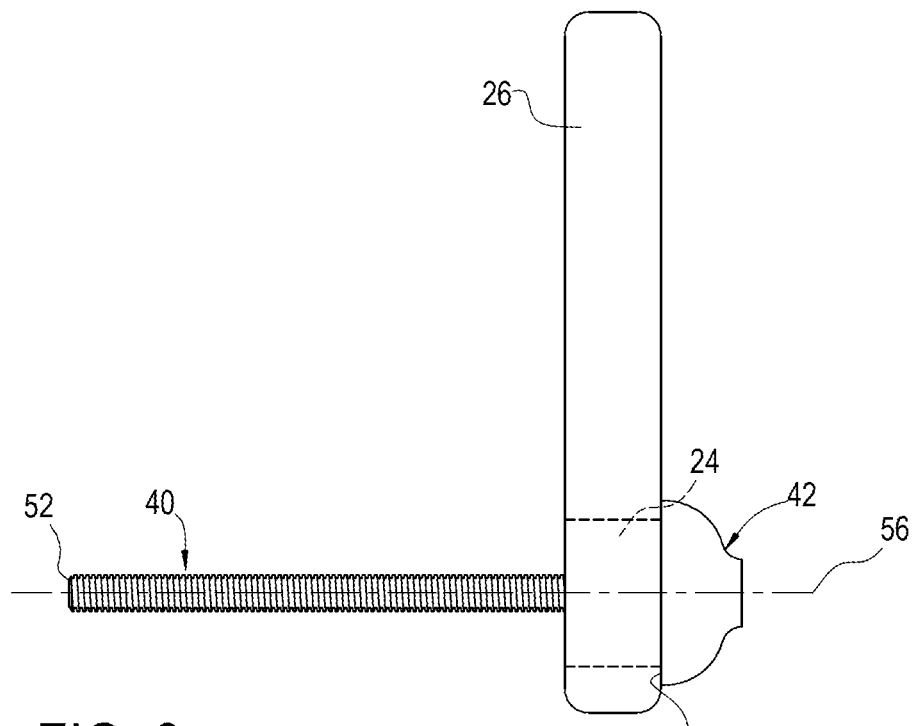
FIGS. 3-11 are side elevation views depicting steps of an example process of using the first example bushing assembly insertion system to insert the bushing assembly into the bushing opening in the structural member.

FIGS. 3-11 illustrate an example method of using the first example bushing assembly insertion system 20. Initially, as shown in FIG. 3, the anchor cavity threaded portion 66 is engaged with the external surface 54 of the brace rod 40 to fix a position of the anchor member 42 relative to the brace rod 40. The brace rod 40 is then arranged such that the brace rod 40 extends through the housing opening 24 with the axis 56 of the brace rod 40 substantially aligned with a longitudinal axis of the housing opening 24. At this point, the anchor edge 62 defined by the anchor member 42 is in contact with the structural member 26 around the housing opening 24.

Figure 4:
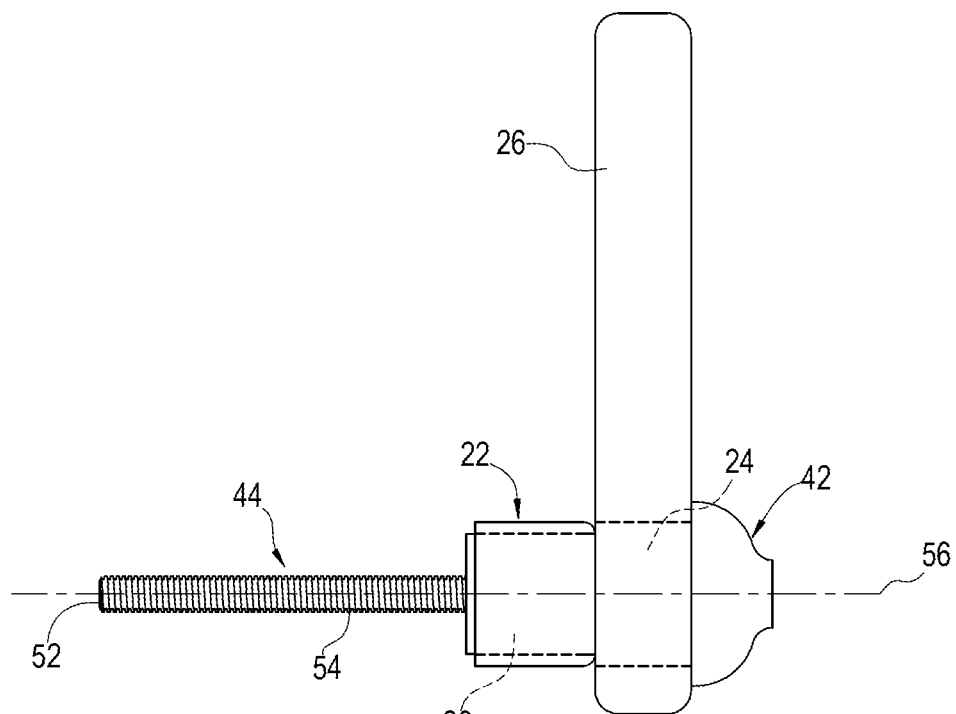

Next, as shown in FIG. 4 the bushing assembly 22 is arranged such that the brace rod 40 extends through the bushing opening 28 defined by the bushing assembly 22 with the axis 56 of the brace rod 40 substantially aligned with a longitudinal axis of the bushing assembly 22.

Figure 5:
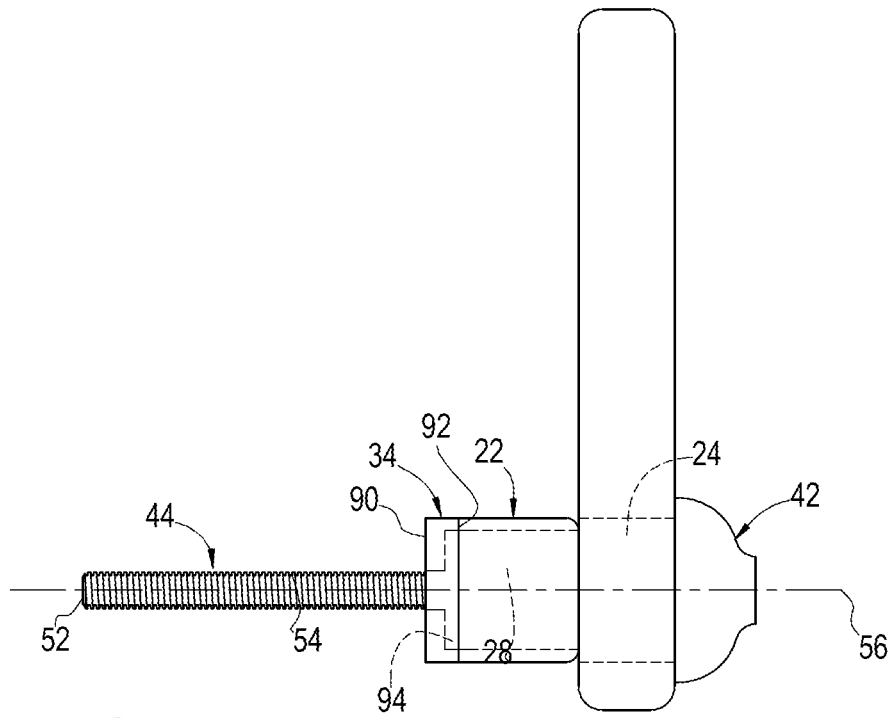

As shown in FIG. 5, the drive plate 34 is next arranged such that the brace rod 40 extends through the drive plate opening 94 and the second drive plate surface 92 is in contact with the bushing assembly 22. In this position, a longitudinal axis of the drive plate 34 is substantially aligned with the brace rod axis 56.

Figure 6:
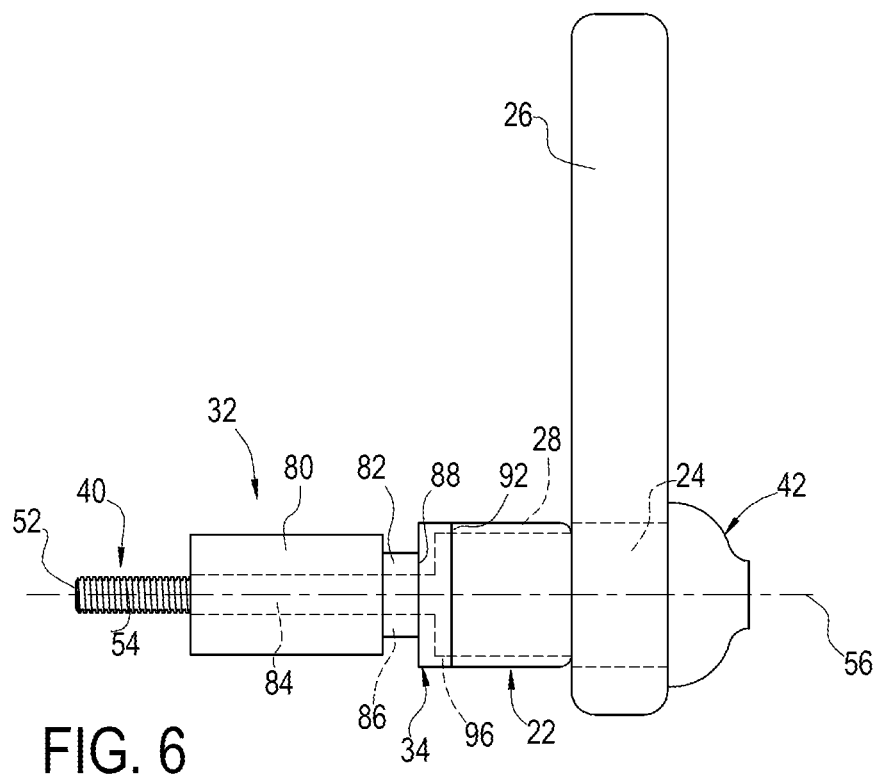

As shown in FIG. 6, the actuator assembly 32 is next arranged such that the brace rod 40 extends through the actuator housing opening 84 and the actuator drive member opening 86. At this point, the drive surface 88 of the actuator drive member 82 is in contact with the second drive plate second surface 92. With the actuator assembly 32 so arranged, a longitudinal axis of the actuator assembly 32 is substantially aligned with the brace rod axis 56.

Figure 7:
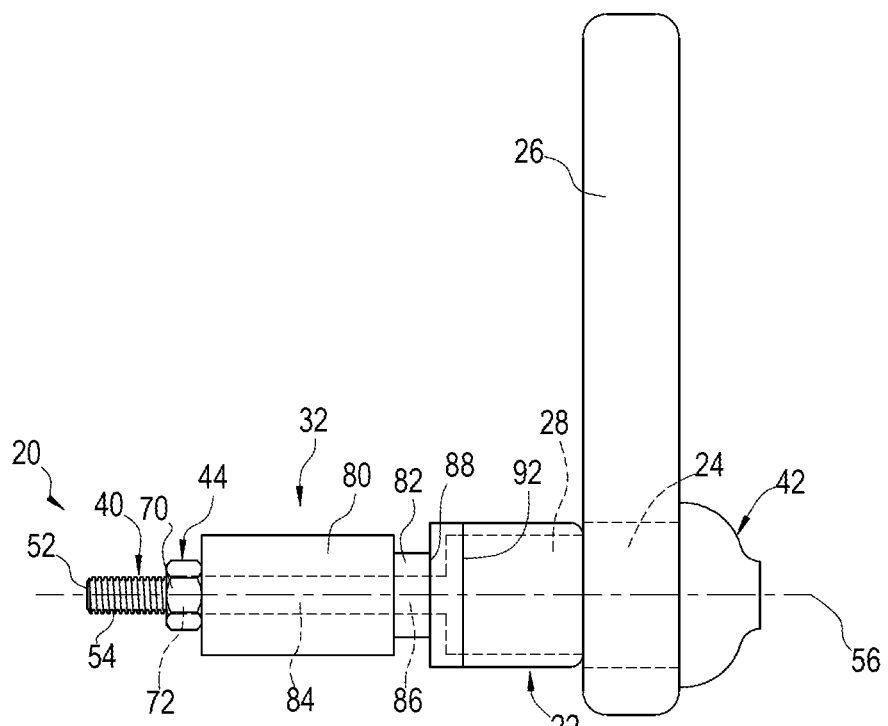
Figure 8:
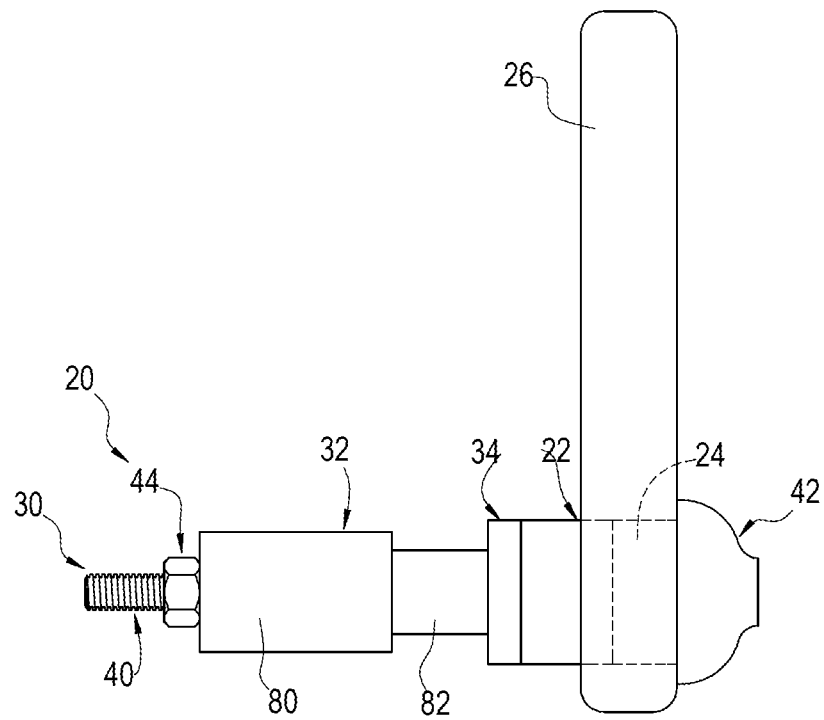

FIG. 7 illustrates that the brace nut 44 is next arranged such that the brace rod 40 engages the internal threaded opening 72 of the brace nut 44. Axial rotation of the brace nut 44 relative to the brace rod 40 displaces the brace nut 44 along the axis 56 of the brace rod 40 until the brace nut engages the actuator housing 80. At this point, the brace assembly 30 is formed, and a distance between the brace nut 44 and the anchor member 42 is substantially fixed. When the brace assembly 30 is formed, the first example bushing assembly insertion system 20 is formed.

With the brace assembly 30 formed as described above, operation of the actuator assembly 32 causes the actuator member 82 to be displaced away from the actuator housing 80 along the rod axis 56. The actuator member 82 acts on and displaces the drive plate 34 which in turn acts on and displaces the bushing assembly 22. The brace assembly 30 prevents movement of the anchor member 42 relative to the structural member 26, so operation of the actuator assembly 32 forces the bushing assembly 22 into the housing opening 24 defined by the structural member 26 as shown by a comparison of FIGS. 7 and 8.

Figure 9:
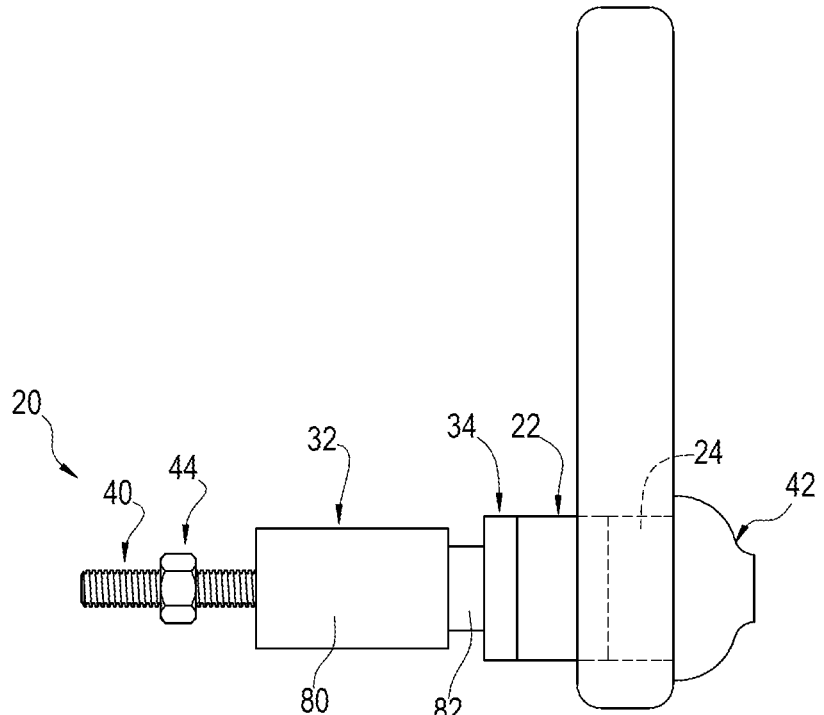
Figure 10:
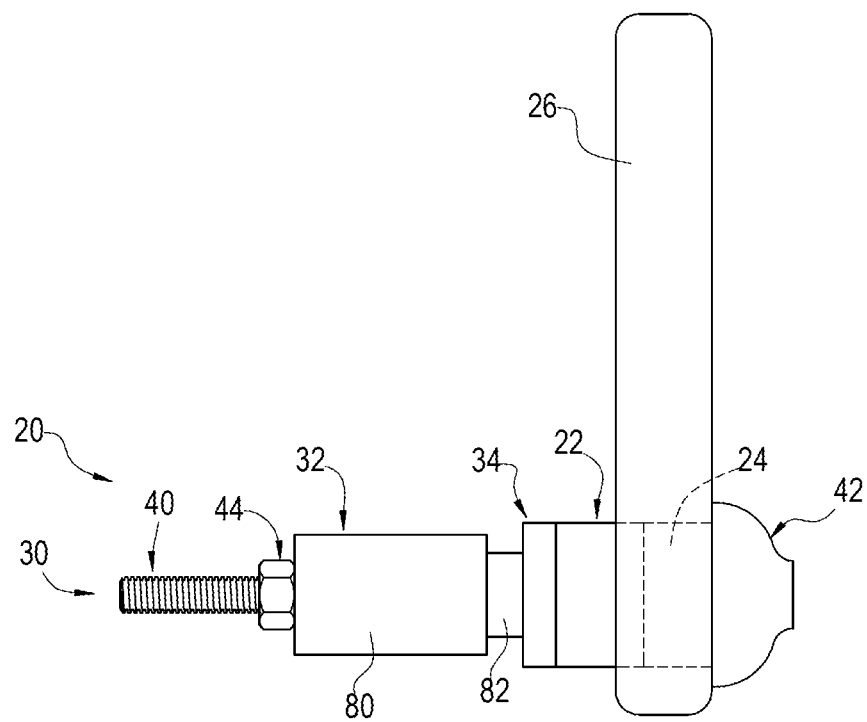

The actuator assembly 32 defines a maximum "throw" distance that the drive member 82 may be forced out of the actuator housing 80. If the throw distance is insufficient to fully drive the bushing assembly 22 into the housing opening, the actuator assembly 32 may be turned off and the actuator housing 80 may be displaced towards the bushing assembly 22 as shown in FIG. 9. The brace nut 44 may be then rotated such that brace nut 44 is displaced along the brace rod 40 until the brace nut 44 contacts the housing as shown in FIG. 10.

Figure 11:
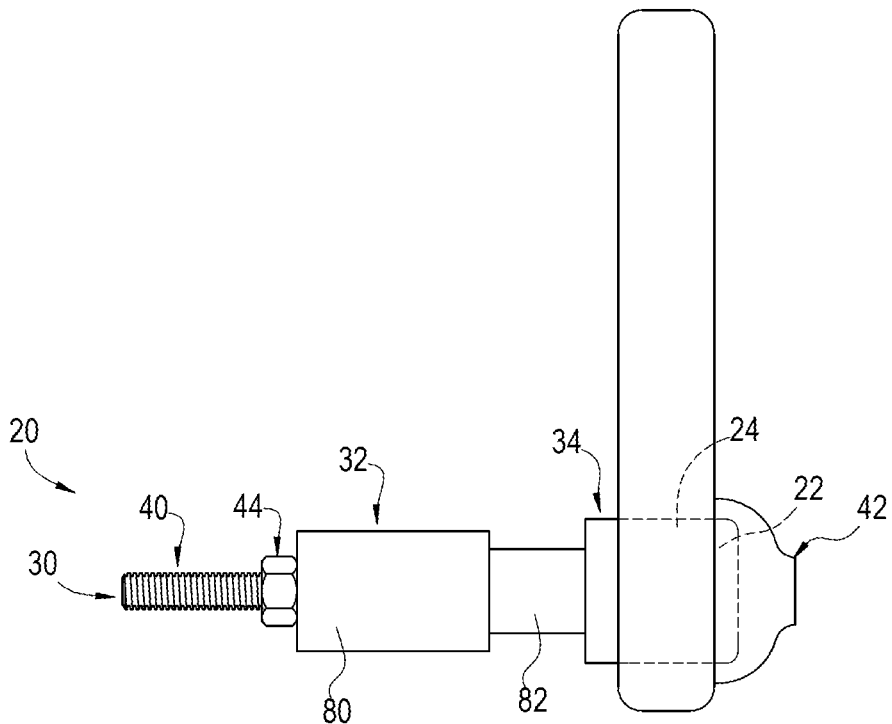
Figure 12:
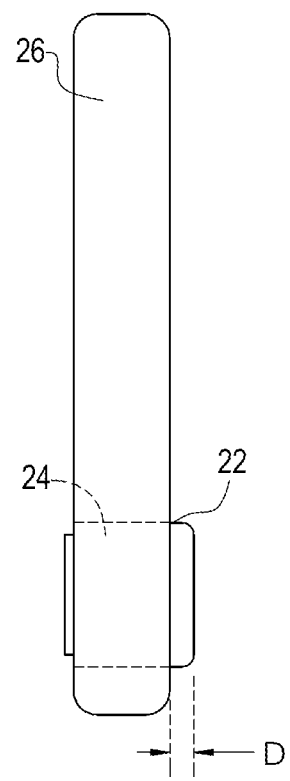
FIG. 12 depicts the bushing assembly supported by the structural member in a desired position relative to the structural member.

The actuator assembly 32 may then be operated to drive the bushing assembly 22 into the bushing assembly opening 24 until the bushing assembly comes into contact with the anchor plate 42 as shown in FIG. 11. At this point, the anchor cavity spacing portion 64 defined by the anchor plate 42 is sized and dimensioned such that the bushing assembly 22 extends out of the housing opening 24 by a desired predetermined distance D as shown in FIG. 12. Accordingly, the anchor plate 42 is configured to stop further movement as soon as the bushing assembly 22 is a desired position relative to the bushing assembly opening 24.

Figure 13:
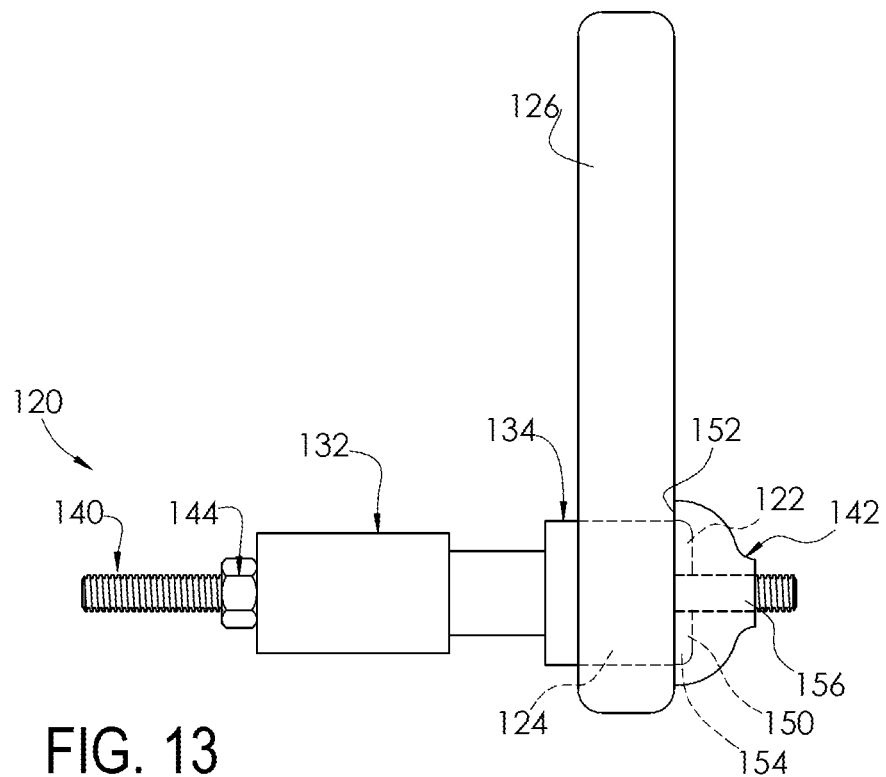
FIG. 13 is a side elevation view illustrating the components of a second example bushing assembly insertion system of the present invention that is adapted to insert a bushing assembly into a bushing opening defined by a structural member.

Referring now to FIG. 13 of the drawing, depicted therein is a second example bushing assembly insertion system 120 constructed in accordance with, and embodying, the principles of the present invention. FIG. 13 illustrates that the first example bushing assembly insertion system 120 may be used to insert an example bushing assembly 122 into an example housing opening 124 defined by an example structural member 126. The example bushing assembly 122 and structural member 126, including the housing opening 124, are or may be conventional and will not be described herein beyond that extent helpful for a complete understanding of the construction and operation of the second example bushing assembly insertion system 120.

The second example bushing assembly insertion system 120 comprises a brace assembly 130, an actuator assembly 132, and a drive plate 134. The example brace assembly 130 comprises a brace rod 140, an anchor member 142, and a brace nut 144. During use of the second example bushing assembly insertion system 120, at least a portion of the example brace rod 140 is arranged to extend through a bushing assembly opening (not shown) in the bushing assembly 122 and the housing opening 124 in the structural member 26 to support the brace nut 144, the actuator assembly 132, the drive plate 134 on a first side of the housing opening 124 and the anchor member 142 on a second side of the housing opening 124. So arranged, operation of the actuator assembly 132 acts on the bushing assembly 122 through the drive plate 134 to force the bushing assembly 122 into the bushing assembly opening 124. The example brace assembly 130 engages the structural member 126 to prevent the actuator assembly 132 from displacing itself away from the structural member 126 during operation of the actuator assembly 132.

The example brace rod 140 and brace nut 144 are or may be the same as the example brace rod 40 and brace nut 44 described above and will not be described herein again in detail.

The example anchor member 142 defines an anchor cavity 160 and an anchor edge 162. The anchor cavity 160 defines an anchor cavity spacing portion 164 and an anchor cavity threaded portion 166. The anchor cavity threaded portion 66 is sized and dimensioned to receive the threaded outer surface of the brace rod 140 adjacent to the first rod end. The example anchor cavity threaded portion 166 further allows the brace rod 140 to extend out of the anchor cavity 160 as shown in FIG. 13. Axial rotation of the brace rod 140 and anchor member 142 relative to each other about a brace rod axis prevents displacement of the anchor member 142 relative to the brace rod 140 along the brace rod axis under predetermined tension loads exerted by the actuator assembly 132.

The second example bushing assembly insertion system 120 is otherwise used in a manner similar to that of the first example bushing assembly insertion system 20 described above.

Figure 14:
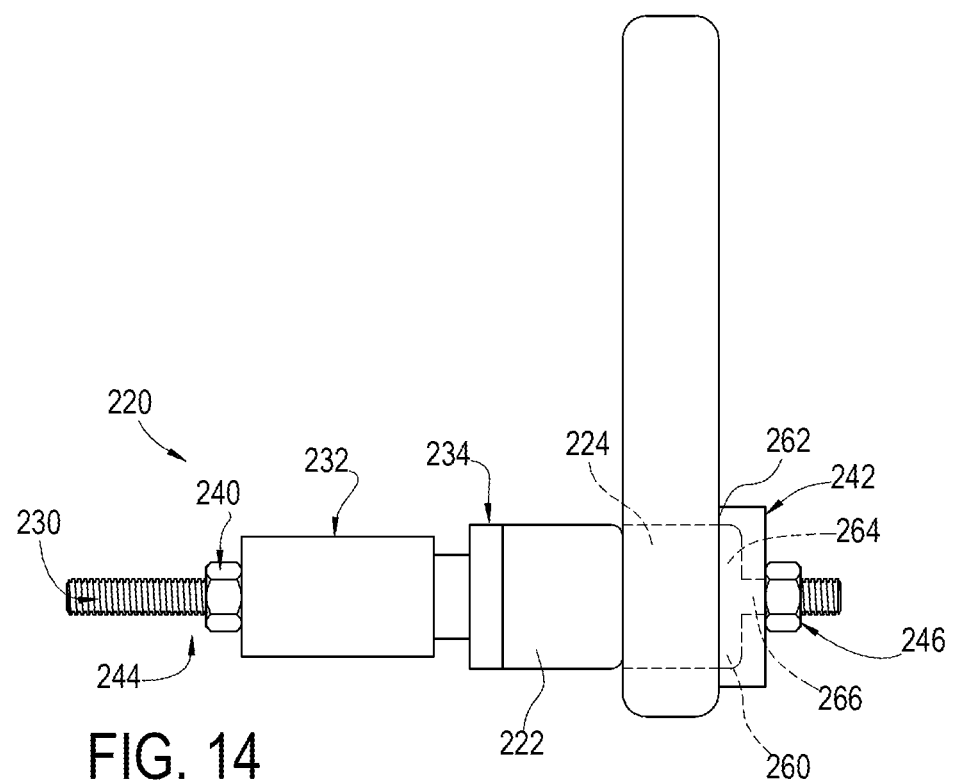
FIG. 14 is a side elevation view illustrating the components of a third example bushing assembly insertion system of the present invention that is adapted to insert a bushing assembly into a bushing opening defined by a structural member.

Referring now to FIG. 14 of the drawing, depicted therein is a third example bushing assembly insertion system 220 constructed in accordance with, and embodying, the principles of the present invention. FIG. 14 illustrates that the first example bushing assembly insertion system 220 may be used to insert an example bushing assembly 222 into an example housing opening 224 defined by an example structural member 226. The example bushing assembly 222 and structural member 226, including the housing opening 224, are or may be conventional and will not be described herein beyond that extent helpful for a complete understanding of the construction and operation of the third example bushing assembly insertion system 220.

The third example bushing assembly insertion system 220 comprises a brace assembly 230, an actuator assembly 232, and a drive plate 234. The example brace assembly 230 comprises a brace rod 240, an anchor member 242, a first brace nut 244, and a second brace nut 246.

During use of the third example bushing assembly insertion system 220, at least a portion of the example brace rod 240 is arranged to extend through a bushing assembly opening (not shown) in the bushing assembly 222 and the housing opening 224 in the structural member 226 to support the brace nut 244, the actuator assembly 232, the drive plate 234 on a first side of the housing opening 224 and the anchor member 242 on a second side of the housing opening 224. So arranged, operation of the actuator assembly 232 acts on the bushing assembly 222 through the drive plate 234 to force the bushing assembly 222 into the bushing assembly opening 224. The example brace assembly 230 engages the structural member 226 to prevent the actuator assembly 232 from displacing itself away from the structural member 226 during operation of the actuator assembly 232.

The example brace rod 240 and brace nut 244 are or may be the same as the example brace rod 40 and brace nut 44 described above and will not be described herein again in detail.

The example anchor member 242 defines an anchor cavity 260 and an anchor edge 262. The anchor cavity 260 defines an anchor cavity spacing portion 264 and an anchor cavity through portion 266. The anchor cavity through portion 266 is sized and dimensioned to allow the threaded outer surface of the brace rod 240 adjacent to the first rod end to extend out of the anchor cavity 260 as shown in FIG. 14. Axial rotation of the brace rod 240 relative to the first brace nut 244 and the second brace nut 246 about a brace rod axis prevents displacement of the anchor member 242 relative to the brace rod 240 along the brace rod axis under predetermined tension loads exerted by the actuator assembly 232.

The third example bushing assembly insertion system 220 is otherwise used in a manner similar to that of the first example bushing assembly insertion system 20 described above.

Referring now to FIG. 15 of the drawing, depicted therein is a fourth example bushing assembly insertion system 320 constructed in accordance with, and embodying, the principles of the present invention. FIG. 15 further illustrates that the fourth example bushing assembly insertion system 320 may be used to insert an example bushing assembly 322 into an example housing opening 324 defined by an example structural member 326. FIG. 15 further illustrates that the example bushing assembly 322 defines a bushing assembly opening 328 sized and dimensioned to receive a shaft (not shown). The example bushing assembly 322 and structural member 326, including the housing opening 324, are or may be conventional and will not be described herein beyond that extent helpful for a complete understanding of the construction and operation of the fourth example bushing assembly insertion system 320.

Bushing assemblies such as the example bushing assembly 322 are sold in numerous shapes and sizes. The example bushing assembly 322 defines a first end configuration 322*a* and a second end configuration 322*b*. The end configurations 322*a* and 322*b* differ for differing bushing assemblies.

As shown in FIG. 1, the fourth example bushing assembly insertion system 320 comprises a brace assembly 330, an actuator assembly 332, and a drive plate 334. The example brace assembly 330 comprises a brace rod 340, an anchor member 342, and a brace nut 344. At least a portion of the example brace rod 340 is arranged to extend through bushing assembly opening 328 in the bushing assembly 322 and the housing opening 324 in the structural member 326 to support the brace nut 344, the actuator assembly 332, the drive plate 334 on a first side of the housing opening 324 and the anchor member 342 on a second side of the housing opening 324. So arranged, operation of the actuator assembly 332 acts on the bushing assembly 322 through the drive plate 334 to force the bushing assembly 322 into the bushing assembly opening 324. The example brace assembly 330 engages the structural member 326 to prevent the actuator assembly 332 from displacing itself away from the structural member 326 during operation of the actuator assembly 332.

Given the foregoing general understanding of the construction and operation of the fourth example bushing assembly insertion system 320, the details of construction and operation of the fourth example bushing assembly insertion system 320 of the present invention will now be described.

The example brace rod 340 defines a first rod end 350 and a second rod end 352, and an outer surface 354 of the example brace rod 340 is threaded at least adjacent to the first rod end 352 and to the second rod end 354. The example brace rod 340 as depicted is threaded along its entire length, but only a portion of the brace rod 340 need be threaded as will become apparent from the following discussion. The example brace rod 340 defines a brace rod axis 356.

The example anchor member 342 defines an anchor cavity 360 and an anchor edge surface 362. The anchor cavity 360 defines an anchor cavity recess portion 364 and an anchor cavity threaded portion 366. The anchor cavity threaded portion 366 is sized and dimensioned to receive the threaded outer surface 354 of the brace rod 340 adjacent to the first rod end 350. Accordingly, axial rotation of the brace rod 340 and anchor member 342 relative to each other about the brace rod axis 356 with the threaded outer surface 354 within the anchor cavity threaded portion 366 prevents displacement of the anchor member 342 relative to the brace rod 340 along the brace rod axis 356 under predetermined tension loads exerted by the actuator assembly 332. The anchor cavity recess portion 364 is adapted to receive the second end 322*b* of the bushing assembly 322.

The example brace nut 344 is or may be conventional and defines an external nut surface 370 and an internal threaded nut opening 372. The internal threaded nut opening 372 is sized and dimensioned to receive the threaded outer surface 354 of the brace rod 340 adjacent to the second rod end 352. Accordingly, axial rotation of the brace rod 340 and brace nut 344 relative to each other about the brace rod axis 356 with the threaded outer surface 354 within the internal threaded nut opening 372 prevents displacement of the brace nut 344 relative to the brace rod 340 along the brace rod axis 356 under predetermined tension loads exerted by the actuator assembly 332. The example external nut surface 350 is a hex surface but other surface configurations may be used.

The example actuator assembly 332 comprises an actuator housing 380 and an actuator drive member 382. The example actuator assembly 332 is or may be conventional and will be described herein only to that extent helpful for a complete understanding of the construction and operation of the fourth example bushing assembly insertion system 320. The example actuator housing 380 defines an actuator housing opening 384, and the example actuator drive member 382 defines an actuator drive member opening 386. The example drive member 382 defines a drive surface 388 and a first connecting surface 388*a*. Operation of the example actuator assembly 332 causes displacement of the example actuator drive member 382 relative to the actuator housing 380. The example actuator assembly 332 may be operated using an electrical drive system, pneumatic drive system, hydraulic drive system, or any other appropriate drive system. The drive system used to supply power to the example actuator system 332 is or may be conventional and is not depicted in the drawing for simplicity and clarity.

The example drive plate 334 defines a first drive plate surface 390, a second drive plate surface 392, and a drive plate opening 394. The example drive plate 334 further defines a drive recess 398*a* and a connecting surface 398*b*. The example drive plate opening 394 defines a drive plate opening first portion 396 and a drive plate opening second portion 398. The drive plate opening 394 extends between the first drive plate surface 390 and the second drive plate surface 392. The drive recess 398*a* on the drive plate 334 is contoured to receive the first end configuration 322*a* of the bushing assembly 322 as will be described in further detail below.

The second connecting surface 398*b* is configured to engage the first connecting surface 388*a* to allow the drive plate 334 to be detachably attached to the actuator housing 380. The example first drive surface 388*a* is internally threaded, and the example second drive surface 398*b* is externally threaded, but other connecting systems for detachably attaching the drive plate 334 to the actuator housing 380 may be used.

As perhaps best shown in FIG. 15, the example brace rod 340 is sized and dimensioned such that the example brace rod 340 may be arranged to extend through the actuator housing opening 384, the actuator drive member opening 386, the adapter late opening 394, and the bushing opening 328. FIG. 15 further illustrates that the example brace rod 340 is sized and dimensioned to extend through the anchor cavity recess portion 364 of the anchor cavity 360. And as described above, the anchor rod 340 is further sized and dimensioned such that to be threaded into the anchor cavity threaded portion 366 and at least partly into the internal nut threaded opening 372. As arranged in FIG. 15, the rod axis 356 of the brace rod 340 defines a longitudinal axis of the fourth example bushing assembly insertion system 320.

The fourth example bushing assembly insertion system 320 is used in a manner similar to that of the first example bushing assembly insertion system 20 described above. However, in the fourth example bushing assembly insertion system 320, the actuator assembly 332 is reversed such that the actuator drive member 382 engages the brace nut 344 and the actuator housing 380 supports the drive plate 334 as generally described above.

The example drive plate 334 and the example anchor member 342 are sold in a variety of configurations to accommodate a variety of configurations of bushing assemblies 322. In particular, the anchor cavity recess portion 364 defined by the anchor member 342 and the drive recess 398a defined by the drive plate 334 are configured as necessary to accommodate a particular bushing assembly 322 and further to locate the particular bushing assembly 322 in a desired position relative to the example structural member 326.

What is claimed is:

1. An insertion system for inserting a bushing assembly having a bushing assembly outer diameter into a structural member having a housing opening, the housing opening having a housing opening inner diameter, comprising:
    a brace assembly comprising
        a brace rod,
        an anchor member defining an anchor edge surface and a spacing portion, and
        a brace nut;
    an actuator assembly comprising an actuator housing defining an actuator housing opening and a drive member defining a drive member opening; and
    a drive plate; wherein
    the brace nut is arranged to engage the actuator housing;
    the anchor member is arranged such that the anchor edge surface acts on the structural member and the brace nut acts on the actuator assembly;
    the drive member is arranged such that displacement of the drive member causes displacement of the drive plate;
    the drive plate is arranged such that displacement of the drive plate causes displacement of the bushing assembly;
    operation of the actuator assembly
        displaces the drive member,
        displacement of the drive member displaces the drive plate, and
        displacement of the drive plate displaces the bushing assembly into the housing opening towards the anchor member; and
    the spacing portion is arranged relative to the anchor edge surface such that, after the drive plate displaces the bushing assembly into the housing opening such that the bushing assembly is located at a desired position relative to the structural member, the spacing portion allows the bushing assembly to engage the anchor member to prevent further displacement of the bushing assembly such that the bushing assembly remains at the desired position relative to the structural member.

2. The insertion system of claim 1, wherein the brace rod comprises:
    a first rod end;
    a second rod end; and
    a threaded outer surface adjacent to the first rod end and the second rod end.

3. The insertion system of claim 2, wherein the outer surface of the brace rod is threaded along its entire length.

4. The insertion system of claim 2, wherein a portion of the outer surface of the brace rod is threaded.

5. The insertion system of claim 2, wherein the anchor member comprises a threaded portion configured to receive the threaded outer surface of the brace rod.

6. The insertion system of claim 1, wherein the brace rod extends through the actuator assembly.

7. The insertion system of claim 1, wherein the brace nut rotates axially relative to the brace rod until the brace nut engages the actuator housing.

8. The insertion system of claim 7, wherein the brace nut prevents movement of the anchor member relative to the structural member during operation of the actuator assembly to displace the drive plate.

9. The insertion system of claim 1, wherein the actuator assembly is configured to drive the bushing assembly until the bushing assembly comes in contact with the anchor member.

10. The insertion system of claim 9, wherein the anchor member is configured to stop further movement of the bushing assembly when the bushing assembly reaches the desired position.

11. An insertion system for inserting a bushing assembly having a bushing assembly outer diameter into a structural member having a housing opening, the housing opening having a housing opening inner diameter, the insertion system comprising:
    a brace assembly comprising
        a brace rod,
        an anchor member defining an anchor edge surface and a spacing portion, and
        a brace nut;
    an actuator assembly comprising an actuator housing defining an actuator housing opening and a drive member defining a drive member opening; and
    a drive plate defining a drive plate recess and a drive plate connecting surface; wherein
    the anchor member is arranged on a first side of the housing opening such that the anchor edge surface is adjacent the structural member;
    the brace rod is extended through the housing opening and operatively connected to the anchor member;
    the bushing assembly is arranged over the brace rod on a second side of the housing opening;
    the drive plate is arranged over the brace rod on the second side of the housing assembly such that the drive plate is adjacent to the bushing assembly;
    the actuator assembly is arranged over the brace rod on the second side of the housing assembly such that the drive member is adjacent to the drive plate;
    the brace nut is operatively connected to the brace rod such that the brace nut is adjacent to the actuator housing;

the brace nut is displaced relative to the brace rod such that the anchor member acts on the structural member and the brace nut acts on the actuator assembly;

operation of the actuator assembly
- displaces the drive member;
- displacement of the drive member displaces the drive plate, and
- displacement of the drive plate displaces the bushing assembly into the housing opening towards the anchor member; and the spacing portion is arranged relative to the anchor edge surface such that, after the drive plate displaces the bushing assembly into the housing portion such that the bushing assembly is located at a desired position relative to the structural member, the spacing portion allows the bushing assembly to engage the anchor member to prevent further displacement of the bushing assembly such that the bushing assembly remains at the desired position relative to the structural member.

12. The insertion system of claim 11, wherein the drive plate connecting surface is configured to allow the drive plate to be attached to the actuator housing and to allow the drive plate to be detached from the actuator housing.

13. The insertion system of claim 11, wherein the drive plate recess is configured to allow the drive plate to be attached to the bushing assembly and to allow the drive plate to be detached from the bushing assembly.

* * * * *